(12) United States Patent
Sakamoto et al.

(10) Patent No.: US 9,262,410 B2
(45) Date of Patent: Feb. 16, 2016

(54) SPEECH TRANSLATION APPARATUS, SPEECH TRANSLATION METHOD AND PROGRAM PRODUCT FOR SPEECH TRANSLATION

(71) Applicant: KABUSHIKI KAISHA TOSHIBA, Minato-ku, Tokyo (JP)

(72) Inventors: Akiko Sakamoto, Kanagawa-ken (JP); Kazuo Sumita, Kanagawa-ken (JP); Satoshi Kamatani, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 230 days.

(21) Appl. No.: 13/753,751

(22) Filed: Jan. 30, 2013

(65) Prior Publication Data

US 2013/0211818 A1 Aug. 15, 2013

(30) Foreign Application Priority Data

Feb. 10, 2012 (JP) ................................. 2012-027698

(51) Int. Cl.
*G06F 17/28* (2006.01)
*G10L 13/033* (2013.01)
*G10L 21/00* (2013.01)
*G10L 15/22* (2006.01)

(52) U.S. Cl.
CPC ............ *G06F 17/289* (2013.01); *G10L 13/033* (2013.01); *G10L 15/22* (2013.01); *G10L 2015/221* (2013.01); *G10L 2015/226* (2013.01)

(58) Field of Classification Search
CPC . G06F 17/289; G10L 2015/221; G10L 15/22; G10L 2015/226; G10L 13/033
USPC ............................. 704/2, 4, 9, 211, 246, 277
See application file for complete search history.

(56) References Cited

U.S. PATENT DOCUMENTS

2007/0198245 A1* 8/2007 Kamatani et al. .................. 704/2
2007/0233471 A1* 10/2007 Ariu .............................. 704/215

(Continued)

FOREIGN PATENT DOCUMENTS

CN 1602483 3/2005
JP 62-040577 2/1987

(Continued)

OTHER PUBLICATIONS

Office Action of Notification of Reasons for Refusal for Japanese Patent Application No. 2012-027698 Dated May 16, 2014, 4 pgs.

(Continued)

*Primary Examiner* — Thierry L Pham
(74) *Attorney, Agent, or Firm* — Amin, Turocy & Watson, LLP

(57) ABSTRACT

According to one embodiment, a speech translation apparatus includes a first input unit configured to input a first speech of a first speaker; a second input unit configured to input a second speech of a second speaker that is different from the first speaker; a first translation unit configured to translate the first speech to a first target language sentence; a second translation unit configured to translate the second speech to a second target language sentence; a first output unit configured to output the first target language sentence; a second output unit configured to output the second target language sentence; a speech detecting unit configured to detect a first speech duration from the first speech and detect a second speech duration from the second speech; and an output timing adjustment unit configured to adjust at least one of the first output unit and the second output unit, when the first speech duration and the second speech duration overlap each other.

16 Claims, 10 Drawing Sheets

(56) References Cited

U.S. PATENT DOCUMENTS

2008/0077387 A1    3/2008    Ariu
2008/0091407 A1*    4/2008    Furihata et al. .................. 704/4

FOREIGN PATENT DOCUMENTS

| | | |
|---|---|---|
| JP | 2007-264473 | 10/2007 |
| JP | 2008-077601 | 4/2008 |
| JP | 2008-083459 | 4/2008 |
| JP | 2009-042291 | 2/2009 |

OTHER PUBLICATIONS

Office Action of Notification of Reasons for Refusal for Japanese Patent Application No. 2012-027698 Dated Jan. 30, 2015, 3 pages.
Chinese Office Action for Chinese Application No. 2013100490468 mailed on May 25, 2015.

* cited by examiner

Fig. 4

| Source language | Source language sentence pattern | Intention |
|---|---|---|
| English | How many ~ ? | Question |
| | ... | ... |
| Japanese | ~できますか？ (Could you .... ?) | Question |
| | ~です。 (It is .....) | Description |
| | ... | ... |

| First intention 501 | Second intention 502 | Priority speaker 503 | Message 504 | Message output destination 505 |
|---|---|---|---|---|
| Question | Question | Second speaker (Japanese speaker) | Please wait | First speaker (English speaker) |
| Description | Question | First speaker | 少々お待ち下さい (Please wait a moment.) | Second speaker |
| Question | Description | Second speaker | Please wait | First speaker |
| ... | ... | ... | ... | ... |

| First intention | Second intention | Priority speaker | Message | Message output destination |
| --- | --- | --- | --- | --- |
| Question | Question | Customer | Please wait | Salesclerk |
| Description | Question | First speaker | 少々お待ち下さい (Please wait a moment.) | Second speaker |
| Question | Description | Second speaker | Please wait | First speaker |
| ⋮ | ⋮ | ⋮ | ⋮ | ⋮ |

SPEECH TRANSLATION APPARATUS, SPEECH TRANSLATION METHOD AND PROGRAM PRODUCT FOR SPEECH TRANSLATION

CROSS REFERENCE TO RELATED APPLICATION

This application is based upon and claims the benefit of priority from Japanese Patent Application No. 2012-027698, filed on Feb. 10, 2012; the entire contents of which are incorporated herein by reference.

FIELD

Embodiments described herein relate generally to speech translation apparatuses and associated methods.

BACKGROUND

With progress of speech processing and natural language processing in recent years, a speech translation apparatus is being developed. In communicating different languages, the speech translation apparatus translates a source language sentence spoken by a source language user to a target language sentence and synthesizes a target language speech to a target language user.

The conventional speech translation apparatus outputs the synthesized speech, regardless of inputting another speech or not. And the output of the synthesized speech and the other speech are overlapped. Therefore mistakes of communication between users occur. The mistakes are frequently encountered in cases of non-face-to-face communication, for example, by telephone with the conventional speech translation apparatus.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 4 shows examples of intention detecting rules.

FIG. 5 shows examples of speaker selection rules.

FIG. 10 shows examples of speaker selection rules of another embodiment.

DETAILED DESCRIPTION

According to one embodiment, a speech translation apparatus includes a first input unit configured to input a first speech of a first speaker; a second input unit configured to input a second speech of a second speaker that is different from the first speaker; a first translation unit configured to translate the first speech to a first target language sentence; a second translation unit configured to translate the second speech to a second target language sentence; a first output unit configured to output the first target language sentence; a second output unit configured to output the second target language sentence; a speech detecting unit configured to detect a first speech duration from the first speech and detect a second speech duration from the second speech; and an output timing adjustment unit configured to adjust at least one of the first output unit and the second output unit, when the first speech duration and the second speech duration overlap each other. In this context, "sentence" means a spoken utterance which can be a grammatically complete sentence or a phrase (incomplete sentence, such an utterance lacking a noun or verb, etc., or even one word, such as an answer to a yes-no question, etc.).

Various Embodiments will be described hereinafter with reference to the accompanying drawings.

One Embodiment

The speech translation apparatus of this embodiment helps speakers of different languages to communicate with each other. In this embodiment, the first speaker is an English speaker and the second speaker is a Japanese speaker. But target languages of the speech translation apparatus are not limited to English and Japanese, as any two languages or any two dialects within a given language (such as Mandarin and Cantonese Chinese) can be employed. The speakers can include more than 3 speakers, and three or more languages and/or dialects.

Figure 1:
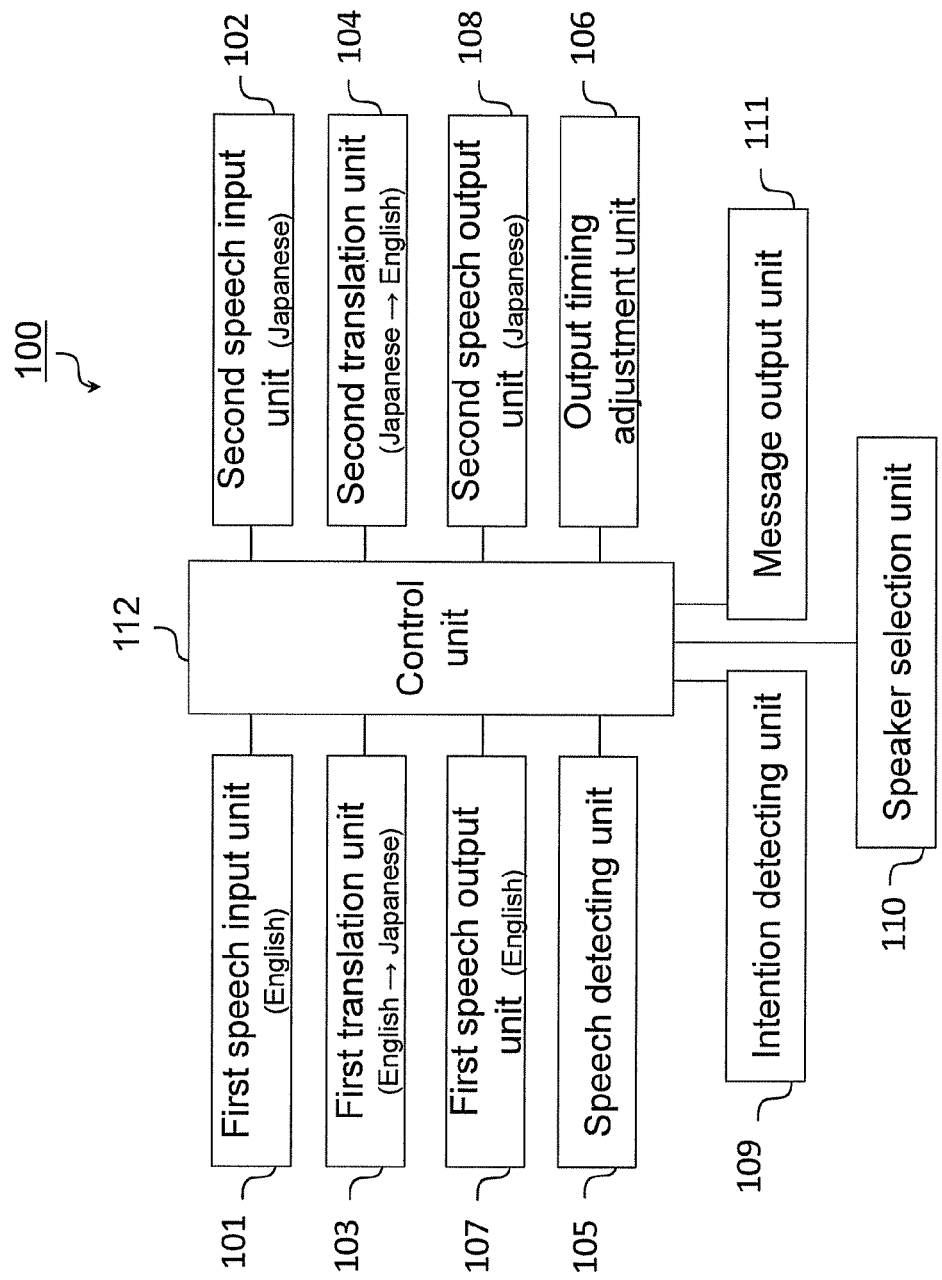
FIG. 1 shows a speech translation apparatus of one embodiment.

FIG. 1 shows the speech translation apparatus 100 of the one embodiment. The apparatus 100 includes a first speech input unit 101 inputting a first speech (English speech) spoken by the first speaker, a second speech input unit 102 inputting a second speech (Japanese speech) spoken by the second speaker, a first translation unit 103 translating the first speech to Japanese and generating the synthesized Japanese speech, a second translation unit 104 translating the second speech to English and generating the synthesized English speech, a speech detecting unit 105 detecting a first speech duration from the first speech and detecting a second speech duration from the second speech, an output timing adjustment unit 106 adjusting a timing of outputting the synthesized Japanese speech or the synthesized English speech so that (A) the duration of outputting the synthesized Japanese speech or the synthesized English speech and (B) the first speech duration or the second speech duration do not overlap each other, a first speech output unit 107 outputting the synthesized English speech to the first speaker according to the instruction of the output timing adjustment unit 106, a second speech output unit 108 outputting the synthesized Japanese speech to the second speaker according to the instruction of the output timing adjustment unit 106, and a control unit 112 controlling the processes of the other units and the communication of information between the other units. The unit 112 can be or include a processor.

By not overlapping, one speaker starts and finishes speech before another speaker begins speech, or after another speaker finishes speech. Overlapping duration occurs when two speakers completely or partially engage in speech at the same time; that is, one speaker starts speaking before the other speaker stops speaking.

The apparatus 100 can adjust the timing of outputting the synthesized speeches of the translated speeches so that the duration of outputting the synthesized speeches and the speech duration of the speakers do not overlap each other.

That is, what does not overlapped, speech duration of a speaker does not overlap with speech synthesis output of the other speaker. In this way the apparatus 100 avoids outputting the synthesized speeches when the speakers say their speeches and smoothly progresses the communications of the speakers.

The apparatus 100 furthermore can include an intention detecting unit 109 detecting the first intention from the English speech spoken by the first speaker and detecting the second intention from the Japanese speech spoken by the second speaker, a speaker selection unit 110 selecting the first speaker or the second speaker based on the first intention and the second intention when the duration of the English speech and the duration of the Japanese speech overlap each other, and a message output unit 111 outputting the predetermined message according to the selection result of the unit 111.

The intention means a broader concept of the purpose that the speaker wants to realize by speech. The intention is extracted from each duration of speech. For example, when the speaker says "How many people will be there?", it is inferred that the speaker wants to ask another speaker a question by this speech. The intention of this speech is "Question". A method of extracting the intention is described below.

When the unit 110 selects the first speaker, the apparatus 100 translates an English speech of the first speaker to Japanese, generates a synthesized Japanese speech and outputs the synthesized Japanese speech by the unit 108. Or when the unit 110 selects the second speaker, the apparatus 100 translates a Japanese speech of the second speaker to English, generates a synthesized English speech and outputs the synthesized English speech by the unit 107.

For example, the apparatus 100 selects the second speaker based on predetermined rules, when a speech of the first speaker and another speech of the second speaker overlap each other, the first intention of the first speaker is "Question", and the second intention of the second speaker is "Description". The apparatus 100 then preferentially outputs the synthesized speech of the second speaker by the unit 107. Outputting preferentially a synthesized speech of one of the speakers can prevent communication between the speakers from progressing with the overlapped speeches status and the confused speakers' status. The predetermined rules using speakers selection is described below.

In this example, the unit 110 selects the second speaker speaking "Description" that is not required to receive the response from another speaker. Thereby the unit 100 can concisely and certainly progress the communication between the speakers.

(Hardware Construction)

Figure 2:
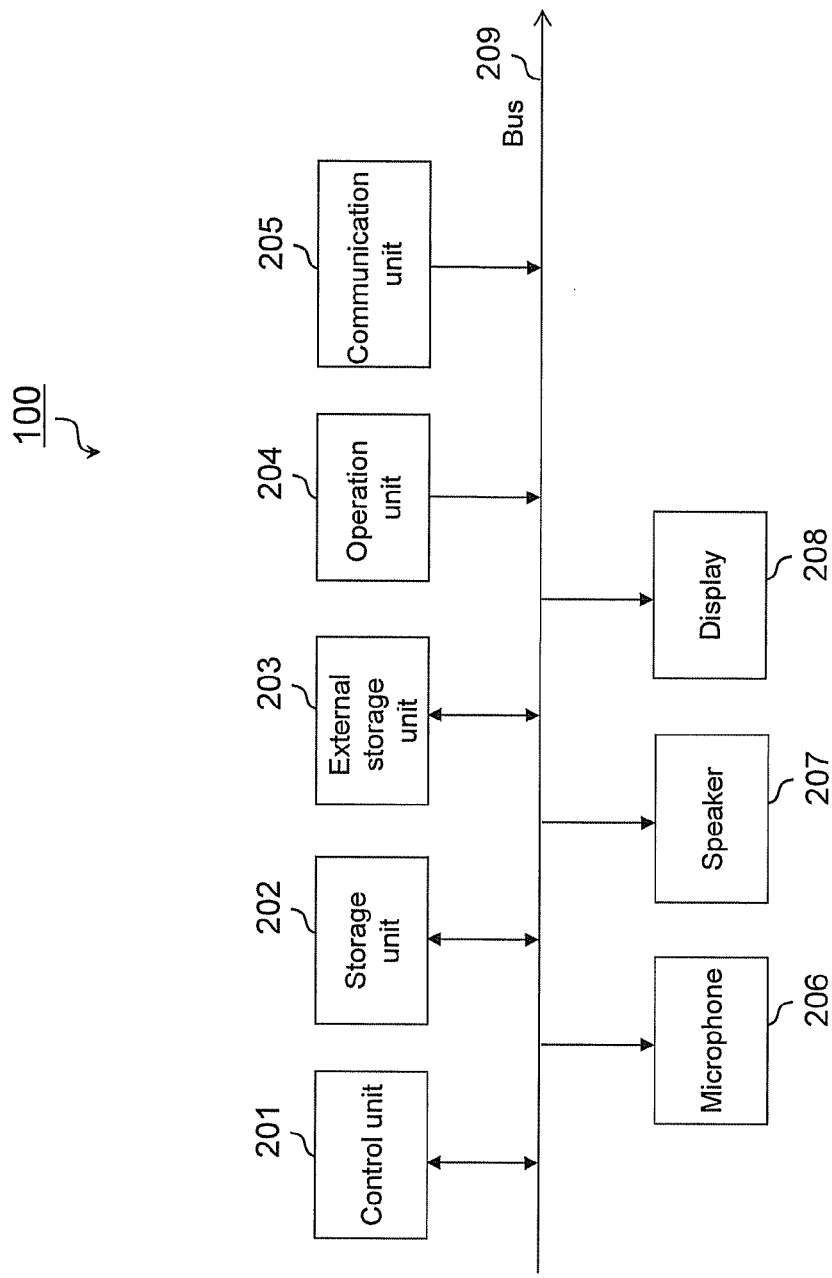
FIG. 2 shows the hardware of the speech translation apparatus.

The apparatus 100 is constructed by the hardware shown in FIG. 2 for example a computer. The apparatus 100 includes a control unit 201 controlling all of the apparatus 100 and being Central Processing Unit (CPU) etc., a storage unit 202 being a Random Access Memory (RAM) etc., an external storage unit 203 storing various data and programs and being Hard Disk Drive (HDD), Compact Disk Drive (CD-Drive), etc., an operation unit 204 receiving input by a speaker and being Keyboard, Mouse, etc., a communication unit 205 controlling the communication with external devices, a microphone 206 acquiring a speech spoken by a user, a speaker 207 generating a synthesized speech, and a display 208 displaying an image, and a bus 209 connecting the above units.

In this hardware construction, when the unit 201 executes the various programs stored by the unit 202 and the unit 203, the below function is realized.

(Each Function of the Units)

The unit 101 acquires the English speech spoken by the first user. The unit 101 can be the microphone 206. The acquired speech is executed by an A/D conversion and the digital speech data is stored by the unit 203.

The unit 102 acquires the Japanese speech spoken by the second user. the other function of the unit 102 is similar to the unit 101.

The unit 103 translates the English speech acquired by the unit 101 to Japanese and generates the synthesized Japanese speech.

The unit 104 translates the Japanese speech acquired by the unit 102 to English and generates the synthesized English speech.

Figure 3:
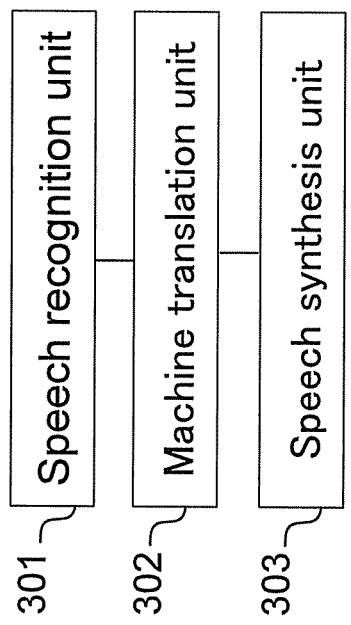
FIG. 3 shows the details of a translation unit.

FIG. 3 shows the details of the units 103 and 104. Each unit 103 and 104 includes a speech recognition unit 301, the machine translation unit 302, and the speech synthesis unit 303. The unit 301 recognizes a source language speech and generates a source language sentence. The speech recognition can be the method of using Hidden Markov Model (HMM). The unit 302 translates the source language sentence to a target language sentence. The machine translation can be the method of using Transfer System, Interlingua System, etc. The unit 303 transfers the target language sentence to a synthesized speech. The speech synthesis can be the method of using Formant Synthesis system or HMM. The execution results of the above units are stored by the unit 202 or the unit 203.

The unit 105 detects the first speech duration from the first speech and the second speech duration from the second speech. The speech duration can be detected by surveying the short-time power of the acquired speech. For example, if a period of time, when a short-time power exceeds a predetermined threshold value, continues more than 100 ms, the start point of the period is set up as the start point of the speech duration. And if another period of time, when another short-time power is less than or equal to the threshold value, continues more than 500 ms, the start point of the other period is set up the end point of the speech duration.

The unit 106 adjusts timings of outputting the synthesized speeches so that the duration of outputting the synthesized speeches and the speech duration of the speakers do not overlap each other. For example, when the unit 105 determines the case that the speech of the first speaker is continuing (that is, the case that the only start point of the speech is detected), the unit 106 stands ready to send a signal instructing the output of the synthesized English speech to the unit 107. After the speech of the first speaker ends (that is, the unit 105 detects the end point of the speech duration), the unit 106 sends the signal to the unit 107.

In other words, the unit 106 sends the signal to the unit so that the start time of outputting the synthesized English speech (that is, the outputting start time) is later than the time corresponding to the end point of the first speakers speech duration (that is, the end time).

If the unit 105 does not detect the speech, the unit 106 sends the signal to the unit 107 without standing ready.

The unit 107 outputs the synthesized English speech to the first speaker according to the instruction of the unit 106. The digital synthesized speech is buffered by the unit 202 or the unit 203 until receiving the signal. Upon receiving the signal, the unit 107 executes D/A conversion of the synthesized speech and the unit 207 outputs the analog synthesized speech.

The unit 108 outputs the synthesized Japanese speech to the second speaker according to the instruction of the unit 106. The other function of the unit 108 is similar to the unit 107.

The unit 109 detects the first intention from the English source language sentence and the second intention from the Japanese source language sentence. The unit 301 of each translation unit generates English and Japanese source language sentences.

In this embodiment, the intention of the source language sentence is detected according to intention detecting rules shown in FIG. 4. 401 represents source languages which are candidates for detection. 402 represents source language sentence patterns. 403 represents the detected intentions when the patterns are matched. For example, when the English source language sentence, which is the result of speech recognition of the first speakers speech, is "How many people will be there?", the English source language sentence is matched with the pattern "How many ~?" represented by 404, and the intention of the English source language sentence is detected as "Question" represented by 405. The method of matching between the source language sentence and the pattern can be realized by the matching character strings. If the patterns 402 do not match the source language sentence, the intention of the sentence is "Description".

The intention detecting rules shown in FIG. 4 can be stored by the unit 202 and the unit 203. Furthermore, the rules can be acquired through the unit 205. Additionally, the unit 109 can use "Confirmation", "Request", etc. in addition to "Description", "Question" as intentions. Another method of detecting intention can be the method of using a statistical model which is learned from the relationship between the source language sentence and the intention by machine learning technique.

The unit 110 determines whether the first speech duration and the second speech duration overlap each other, based on the detection result of the unit 105. When the first speech duration and the second speech duration overlap, the unit 110 selects one of the first speaker and the second speaker, based on the intension detected by the unit 109. The apparatus 100 preferentially outputs the synthesized speech of the selected speaker through the speech output unit.

In this embodiment, the speaker is selected based on speaker selection rules shown in FIG. 5. 501 represents the type of the first intention. 502 represents the type of the second intention. 503 represents the speaker selected according to the combination between the first intention and the second intention. 504 represents the message output by the unit 111, which is described below. 505 represents the output destination of the message.

For example, when the first intention is "Description" and the second intention is "Question", the first speaker is selected by the line 507 shown in FIG. 5. At this time, the unit 111 outputs the message「少々お待ち下さい」(Please wait a moment) to the second speaker (Japanese speaker) who is not yet selected. And then the apparatus 100 translates the speech of the first speaker to Japanese, generates the synthesized Japanese speech and outputs the synthesized Japanese speech through the unit 108.

In this case, the unit 110 selects the speaker who speaks the speech corresponding to "Description". The intention "Description" represents that the response from speech partner is not required. Therefore, the apparatus 100 can concisely progress the communications of the speakers.

The speaker selection rules shown in FIG. 5 can be stored by the unit 202 or the unit 203. In addition, the rules can be acquired by the unit 205.

The unit 111 outputs a predetermined message according to the result selected by the unit 110. The predetermined message can be displayed as character strings by the display 208. Or the predetermined message can be generated as the synthesized speech and the synthesized speech can be output by each speech output unit. In the case of outputting the synthesized speech, the synthesized speech is generated based on the other voice quality, which is different from the voice quality of the synthesized speech generated by the translation unit. Therefore, The first and the second speakers can determine whether the outputting synthesized speech is the message of the apparatus 100 or the translated speech of the speech partner.

The unit 112 controls the processes of the other units and the communication of information between the other units.

(Flow Chart)

Figure 6:
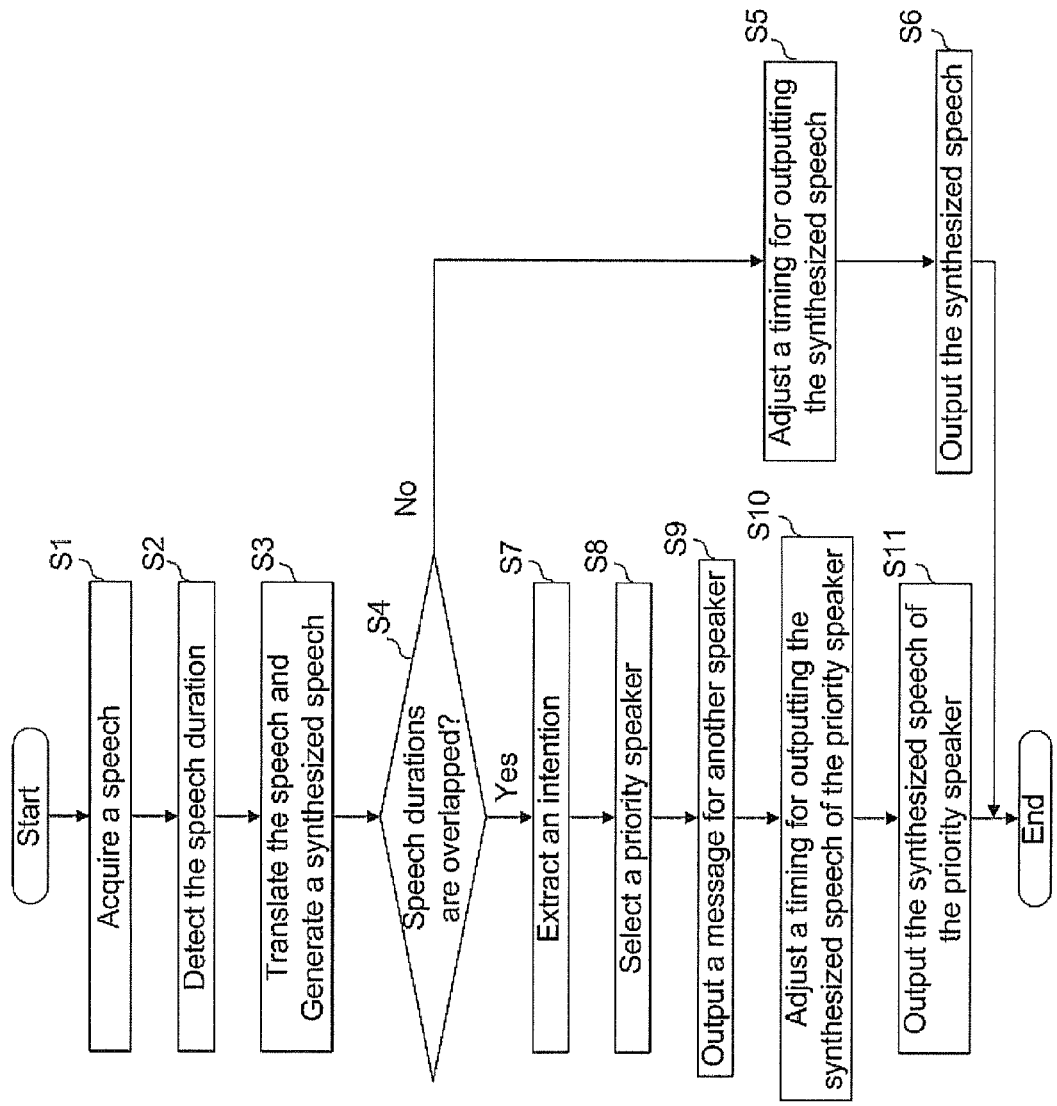
FIG. 6 illustrates a flow chart of the operation of the speech translation apparatus.

FIG. 6 illustrates an exemplary flow chart of the operation of the apparatus 100.

The unit 101 acquires a speech of the first speaker. The unit 102 acquires a speech of the second speaker (S1).

The unit 105 detects the first speech duration from the speech of the first speaker and detects the second speech duration from the speech of the second speaker (S2).

The unit 103 translates the speech of the first speaker to Japanese and generates the synthesized Japanese speech. The unit 104 translates the speech of the second speaker to English and generates the synthesized English speech (S3).

The unit 105 determines whether the first speech duration and the second speech duration overlap each other (S4). If they do not overlap, the operation moves to S5. If they overlap, the operation moves to S7. If the unit 105 does not detect the first speech duration or the second speech duration on S2, the unit 105 determines that they do not overlap each other.

(The Processes of the Case with No Overlap)

In S5, the unit 106 adjusts timings of outputting the synthesized speeches so that the duration of outputting the synthesized speeches and the speech duration of the speakers do not overlap each other. For example, if the speech of the first speaker is continuing at S5 (that is, if the unit 105 detects only the start point of the speech duration), the unit 106 stands ready to send the signal instructing the output of the second synthesized speech until after the speech of the first speaker ends (that is, the unit 105 detects the end point of the first speech duration). After the speech of the first speaker ends (that is, the unit 105 detects the end point of the first speech duration), the unit 106 sends the signal to the unit 107.

In S6, the unit 107 or the unit 108 outputs the synthesized speeches according to the signal received from the unit 106.

(The Processes of the Case with Overlap)

In S7, the unit 109 first and second intentions from the English and Japanese source language sentences generated by each unit 301 of the translation units 103 and 104.

In S8, the unit 110 selects one of the first and the second speakers based on the first and the second intentions.

In S9, the unit 111 outputs the predetermined message according to the result selected at S8.

In S10, the unit 106 adjusts the timing of outputting the synthesized speech of the speaker selected at S8. If the first speaker is selected at S8, the unit 106 adjusts the timing of outputting the synthesized Japanese speech. If the second speaker is selected at S8, the unit 106 adjusts the timing of outputting the synthesized English speech. The specific process on the timing adjustment is similar to S5.

In S11, the unit 107 or unit 108 outputs the synthesized speech of the speaker selected at S8 according to the instruction of the unit 106. If the first speaker is selected at S8, the unit 108 outputs the synthesized Japanese speech. If the second speaker is selected at S8, the unit 107 outputs the synthesized English speech.

(Examples of Different Languages Communication)

Figure 7:
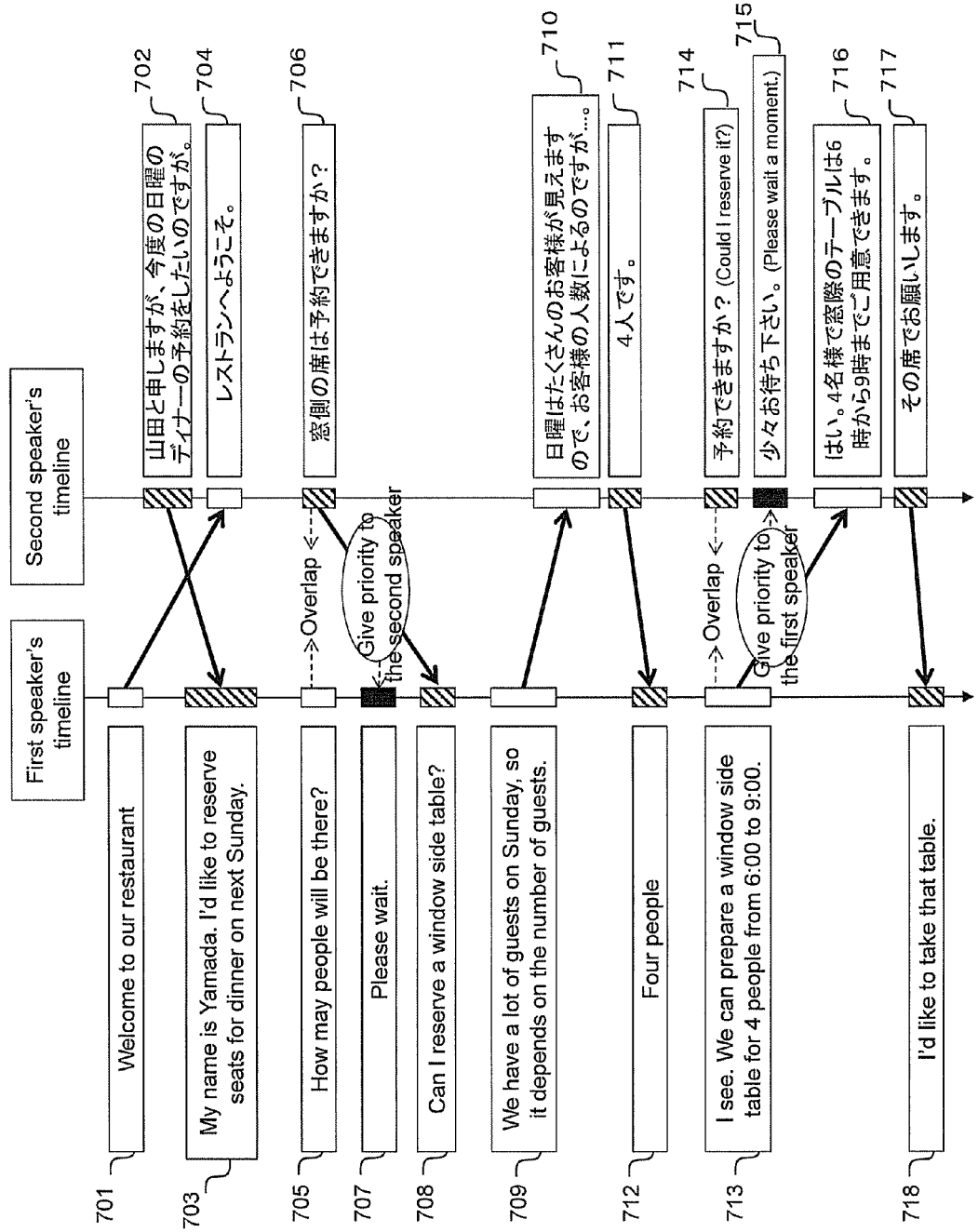
FIG. 7 illustrates a flow of the communication of one embodiment.

FIG. 7 illustrates a flow of the communication of one embodiment between the first speaker (English speaker) and the second speaker (Japanese speaker).

Two arrowed lines from top center through bottom center are timelines that represent timings of the first speeches, the second speeches, and outputs of the synthesized speeches. White squares on the timelines represent durations of the first speeches spoken by the first speaker, or durations of outputting the synthesized Japanese speeches generated by the unit 103. Hatched squares on the timelines represent durations of the second speeches spoken by the second speaker, or durations of outputting the synthesized English speeches generated by the unit 104. Black squares on the timelines represent duration of outputting the message of the unit 111. Arrowed lines from right side to left side represent directions of translation. For example, It is represented that the unit 103 translates the speech 701 "Welcome to our restaurant" to the speech 704「レストランへようこそ。」.

(The Case of the Speech 701 "Welcome to Our Restaurant")

In S1 on FIG. 6, the unit 101 acquires the speech 701 spoken by the first speaker. In S2 on FIG. 6, the unit 105 detects the duration of the speech 701. At this time the second speaker does not speak and the second speech duration is not detected.

In S3 on FIG. 6, the unit 103 translates the speech 701 to「レストランへ ようこそ。」and the synthesized Japanese speech. The second speech duration is not detected. The first speech duration and the second speech duration do not overlap each other. And the operation in FIG. 6 moves from S4 to S5.

In S5 on FIG. 6, the unit 106 adjusts timings of outputting the synthesized Japanese speech. In FIG. 7, the speech 701 of the first speaker finishes and immediately the speech 702 of the second speaker starts. In S3 on FIG. 6, when the synthesized Japanese speech is completed generating, the unit 105 detects the start point of the speech 702. And when the unit 105 detects the end point of the speech 702, the unit 106 sends the signal instructing the output of the synthesized Japanese speech 704 to the unit 108. Therefore, the start time of outputting the synthesized Japanese speech 704 is later than the end time of outputting the speech 702 of the second speaker.

In this way, the apparatus 100 outputs the synthesized speech so that the duration of the synthesized speech and the duration of the speech spoken by the speaker do not overlap each other. Therefore, the apparatus 100 can prevent outputting the synthesized speech while the speaker speaks speech.

(The Cases of the Speech 701 "how Many People Will be there?" and the Speech 706「窓際の席は予約 できますか？」)

In S1 through S3 on FIG. 6, the processes translate each speech and generate each synthesized speech. In S4 on FIG. 6, the unit 105 determines whether the first and the second speech durations overlap each other. In this case, the speech 705 and the speech 706 overlap and the process of S4 thus moves to S7.

In S7 on FIG. 6, the unit 109 detects the intentions from each source language sentence of each speech based on the intention detecting rules. The source language sentence of the speech 705 is "How many people will be there?" The sentence match the pattern 404 in FIG. 4. Therefore, the intention of the speech 705 is detected as "Question". The source language sentence of the speech 706 is「窓際の席は予約 できますか？」.

The sentence matches the pattern 406 in FIG. 4. Therefore, the intention of the speech 706 is detected as "Question".

In S8 on FIG. 6, the unit 110 selects the speaker based on the intention detected at S7. In this case. The first and the second intention represent "intention". The second speaker is selected by the line 506 in FIG. 5.

In S9 on FIG. 6, the unit 111 outputs the message "Please wait" of the line 506 in FIG. 5 to the first speaker. In this case, the message is transferred to the synthesized English speech and the speech 707 in FIG. 7 is output by the unit 107

In S10 on FIG. 6, the unit 106 adjusts timing of outputting the synthesized speech of the second speaker so that the duration of outputting the synthesized speech and the speech duration of the first speaker do not overlap each other. In S11 on FIG. 6, the unit 107 outputs the synthesized speech of the second speaker (the speech 708 in FIG. 7).

As noted above, the apparatus 100 selects one of the speakers and outputs the synthesized speech of the selected speaker, when the speeches of the speakers overlap. Therefore, the apparatus 100 can prevent communication between the speakers from progressing with the overlapping speeches and the confusing the speakers'.

In the case of the speech 713 of the first speaker and the speech 714 of the second speaker, the unit 109 similarly detects the intentions from the source language sentences of each speech based on the intention detecting rules in FIG. 4 (S7 in FIG. 6). In this case, the intention of the speech 713 is detected as "Description" and the intention of the speech 714 is detected as "Question". In S8 on FIG. 6, the unit 110 selects the first speaker speaking the speech 713 as "Description" based on the speaker selection rules in FIG. 5. Therefore, the unit 100 can concisely and certainly progress the communication between the speakers by selecting the speaker that speaks "Description" that is not required to receive the response from another speaker.

This embodiment involves cases of face-to-face communication. But it is not so limited, as this embodiment can be applied in cases of non-face-to-face communication.

Another Embodiment

Change Example 1

Figure 8:
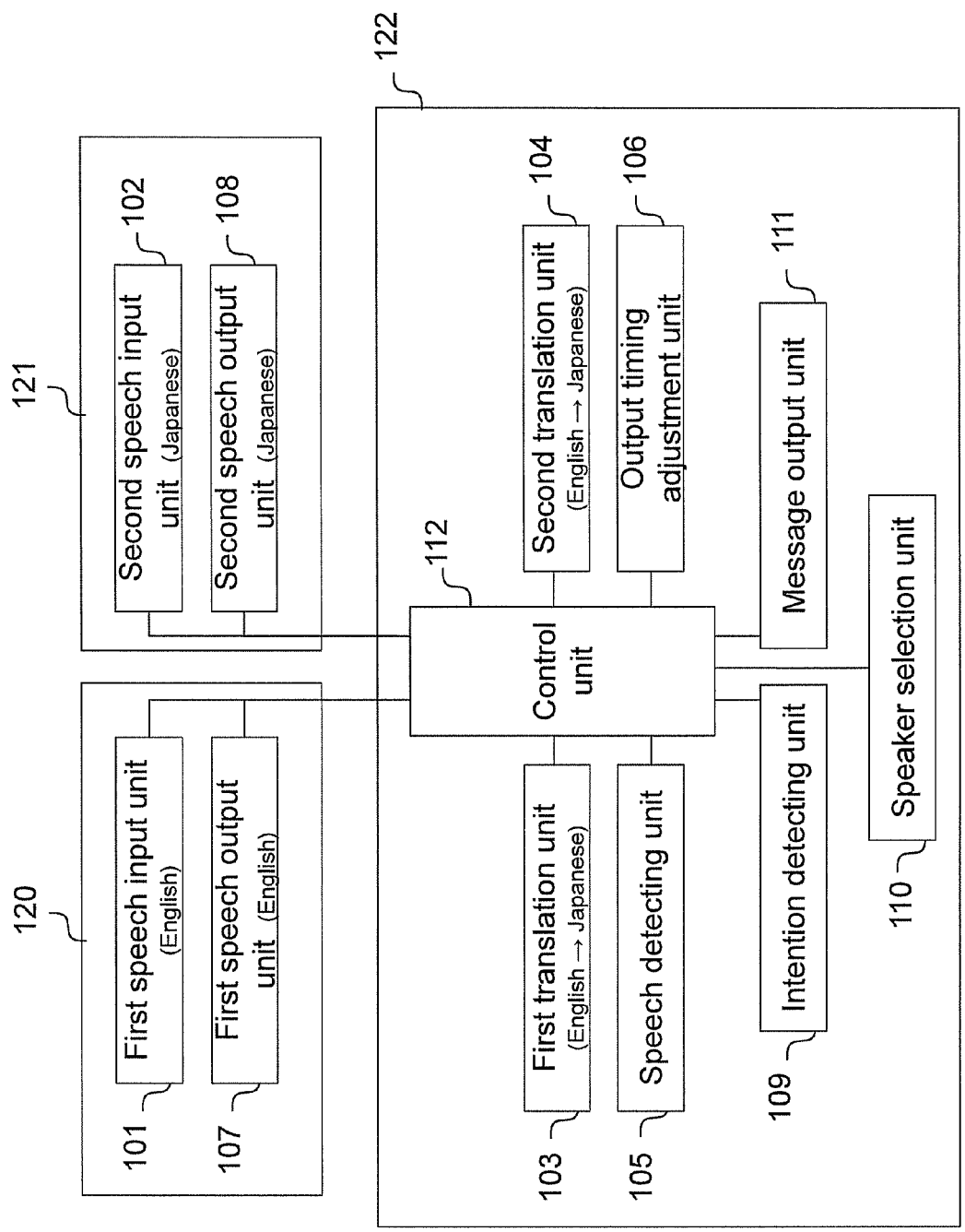
FIG. 8 shows a speech translation apparatus of another embodiment.

FIG. 8 shows a speech translation apparatus of another embodiment. The first terminal 120 includes the unit 101 and the unit 107. The second terminal 121 includes the unit 102 and the unit 108. The server 122 includes the unit 103, the unit 104, the unit 105, the unit 106, the unit 109, the unit 110, and the unit 111. The terminals 120 and 121 are constructed by the hardware shown in FIG. 2. The terminals 120 and 121 communicate information with the unit 112 in the server 122 through the unit 205 in FIG. 2. Therefore, the construction of the terminals 120 and 121 can be compact by including the units 103 and 104 etc. being high calculation costs in the server 122.

The above units can be included in one of the terminal 120, the terminal 121, and the server 122.

The apparatus 100 includes the input units 101 and 102 but is not limited thereto, as only one input unit can acquire all of the speeches of the speakers. The output units 107 and 108 output the synthesized speech, but it is not limited thereto, as only one output unit can output all of the synthesized speech.

The unit 105 can be realized by using function of detecting speeches included in the unit 301. The units 103 and 104 can be realized by the only one translation unit.

Change Example 2

Figure 9:
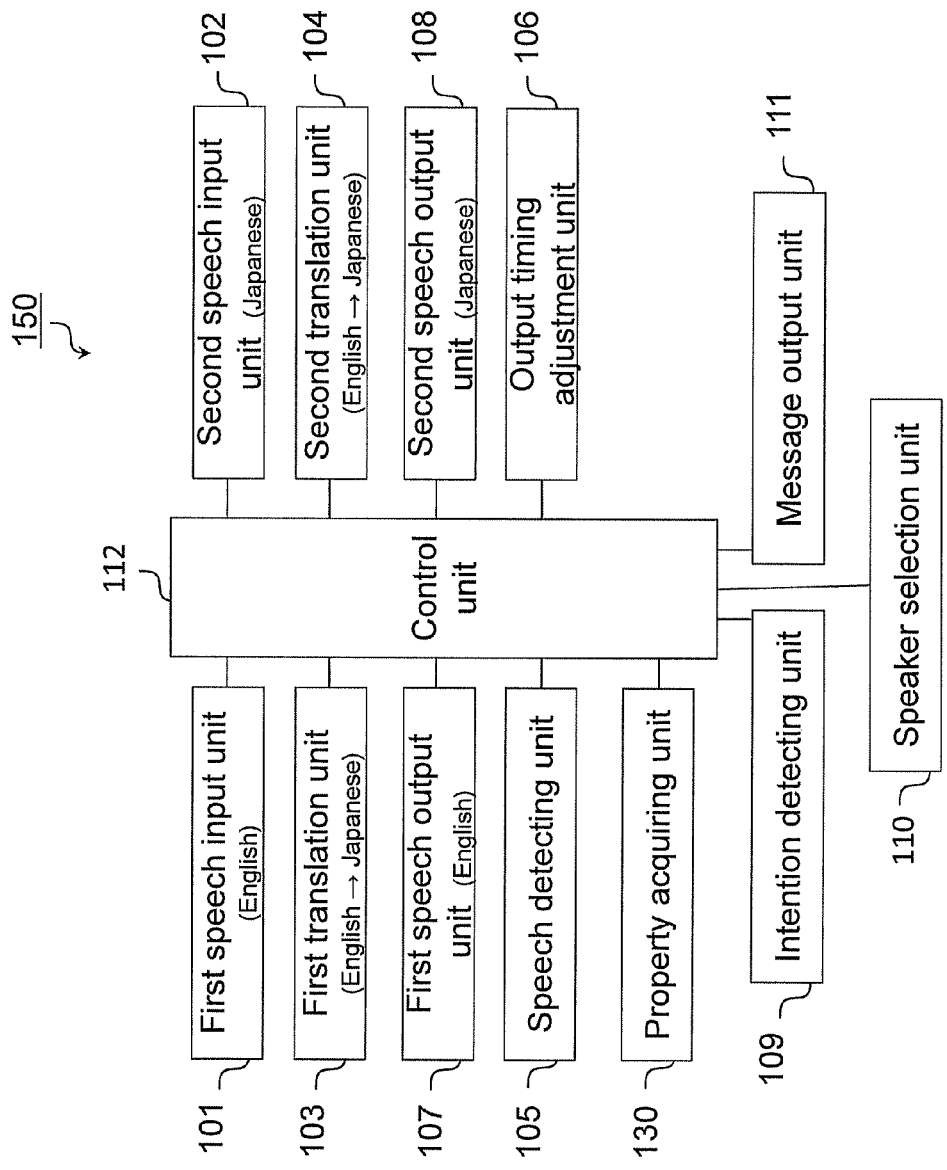
FIG. 9 shows a speech translation apparatus of another embodiment.

FIG. 9 shows a speech translation apparatus of another embodiment. The speech translation apparatus 150 can include a property acquiring unit 130 acquiring properties of the first and the second speakers. The property represents a property or characteristic of the speaker, for example, "Salesclerk" or "Customer".

The unit 130 displays available properties of the apparatus 150 to the speakers by using the display 208. The unit 130 acquires a property selected through the unit 204 in FIG. 2 as the property of the speaker.

The case in FIG. 7 involves a communication in a sales situation (restaurant). The unit 130 displays properties of "Salesclerk" and "Customer" to the first and the second speakers. The first speaker selects "Salesclerk" and the second speaker selects "Customer" through the unit 204 in FIG. 2.

Properties can be acquired by profiles of speaker that is preliminarily registered. Properties can be estimated by the location data of a Global Positioning System (GPS) or Speaker's accent, etc.

The unit 110 selects speakers by using the properties acquired by the unit 130. The preferential speaker is selected by the speaker selection rules shown in FIG. 10. 1001 represents a property of speaker who is preferentially selected.

This case is supposed that the property of the first speaker is "Salesclerk" and the property of the second speaker is "Customer". And the intentions of the speeches 705 and 706 are "Question". In this case, 1001 of the speaker selection rules shown in FIG. 10. The unit 110 preferentially selects the second speaker having the property "Customer". Therefore, the unit 110 can selected the suitable speaker according to property.

The unit 130 can extract speaker's age, position, closeness, gender, etc. as a property. The unit 110 can typically preferentially select the second speaker having the property "Customer" in FIG. 7.

Change Example 3

If the durations of the speeches overlap each other, the unit 110 can measure the importance ratio of each speech and can preferentially select the speaker with the higher importance ratio. The importance ratio of each speech can be calculated by comparing the source language sentence and the statistical model on importance ratio of sentence. The statistical model is learned beforehand by learning-corpus that is added sentences to the importance ratio by manpower. When the durations of the speeches overlap, the unit 110 can preferentially select the speaker who speaks the source language sentence of higher importance ratio than another speaker.

The method of selecting the speaker can be the method of comparing the relative importance ratio of speeches by using the statistical model. In this case, the statistical model is learned by pair sentences added small and large of the importance ratio by manpower. When the durations of the speeches overlap each other, the unit 110 can preferentially select the speaker who speaks the source language sentence with a higher importance ratio than another speaker.

According to speech translation apparatus of at least one embodiment described above, the output timing adjustment unit can prevent progressing communication between the speakers with overlapping speeches and confusing the speakers.

The flow charts of the embodiments illustrate methods and systems according to the embodiments. It will be understood that each block of the flowchart illustrations, and combinations of blocks in the flowchart illustrations, can be implemented by computer program instructions. These computer program instructions can be loaded onto a computer or other programmable apparatus to produce a machine, such that the instructions which execute on the computer or other programmable apparatus create means for implementing the functions specified in the flowchart block or blocks. These computer program instructions can also be stored in a non-transitory computer-readable memory that can direct a computer or other programmable apparatus to function in a particular manner, such that the instruction stored in the non-transitory computer-readable memory produce an article of manufacture including instruction means which implement the function specified in the flowchart block or blocks. The computer program instructions can also be loaded onto a computer or other programmable apparatus/device to cause a series of operational steps/acts to be performed on the computer or other programmable apparatus to produce a computer programmable apparatus/device which provides steps/acts for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech translation apparatus comprising:
a processor;
a first input unit configured to input a first speech of a first speaker;
a second input unit configured to input a second speech of a second speaker that is different from the first speaker;
a first translation unit configured to translate the first speech to a first target language sentence;
a second translation unit configured to translate the second speech to a second target language sentence;
a first output unit configured to output the first target language sentence;
a second output unit configured to output the second target language sentence;
a speech detecting unit configured to detect a first speech duration from the first speech and detect a second speech duration from the second speech;
an output timing adjustment unit configured to adjust at least one of the first output unit and the second output unit, when the first speech duration and the second speech duration overlap each other;
an intention detecting unit configured to detect a first intention from the first speech and detect a second intention from the second speech; and
a speaker selection unit configured to select the first speaker or the second speaker based on the first intention and the second intention, when the first speech duration and the second speech duration overlap each other;
wherein the first output unit outputs the first target language sentence, when the speaker selection unit selects the first speaker.

2. The apparatus according to claim 1, wherein the first output unit outputs the first target language sentence after the second input unit inputs another second speech of the second speaker.

3. The apparatus according to claim 1, wherein the second output unit outputs the second target language sentence after the first input unit inputs another first speech of the first speaker.

4. The apparatus according to claim 1, further comprising wherein the second output unit outputs the second target language sentence, when the speaker selection unit selects the second speaker.

5. The apparatus according to claim 1, further comprising wherein, the intention detecting unit detects whether one of the first intention and the second intention is a description, the speaker selection unit selects the first speaker or the second speaker corresponding the one of the first intention and the second intention.

6. The apparatus according to claim 1, further comprising a message output unit configured to output a predetermined message according to the first speaker or the second speaker selected by the speaker selection unit.

7. The apparatus according to claim 6, wherein the message output unit outputs the predetermined message by a voice that is different from voices of the first output unit and the second output unit.

8. The apparatus according to claim 1, further comprising a property acquiring unit configured to acquire a first property of the first speaker and a second property of the second speaker; and
the speaker selection unit configured to select the first speaker or the second speaker based further on the first property and the second property, when the first speech duration and the second speech duration overlap each other.

9. The apparatus according to claim 8, further comprising wherein the first output unit outputs the second target language sentence, when the speaker selection unit selects the second speaker.

10. The apparatus according to claim 1, further comprising a speech recognition unit configured to recognize the first speech and the second speech;
wherein the first translation unit translates the recognized first speech to the first target language sentence, and the second translation unit translates the recognized second speech to the second target language sentence.

11. The apparatus according to claim 1, further comprising a speech synthesis unit configured to synthesize speech for the first target language sentence and the second target language sentence.

12. A speech translation method comprising:
inputting a first speech of a first speaker;
inputting a second speech of a second speaker that is different from the first speaker;
translating the first speech to a first target language sentence;
translating the second speech to a second target language sentence;
outputting the first target language sentence;
outputting the second target language sentence;
detecting a first speech duration from the first speech and detect a second speech duration from the second speech
adjusting at least one of outputting the first target language sentence and outputting the second target language sentence, when the first speech duration and the second speech duration overlap each other;
detecting a first intention from the first speech and detect a second intention from the second speech; and
selecting the first speaker or the second speaker based on the first intention and the second intention, when the first speech duration and the second speech duration overlap each other;
wherein the first target language sentence is outputted when the speaker the first speaker is selected.

13. A computer program product having a non-transitory computer readable medium comprising programmed instructions for performing a speech translation processing, wherein the instructions, when executed by a computer, cause the computer to perform:
inputting a first speech of a first speaker;
inputting a second speech of a second speaker that is different from the first speaker;
translating the first speech to a first target language sentence;
translating the second speech to a second target language sentence;
outputting the first target language sentence;
outputting the second target language sentence;
detecting a first speech duration from the first speech and detect a second speech duration from the second speech; and
adjusting at least one of outputting the first target language sentence and outputting the second target language sentence, when the first speech duration and the second speech duration overlap each other;
detecting a first intention from the first speech and detect a second intention from the second speech; and
selecting the first speaker or the second speaker based on the first intention and the second intention, when the first speech duration and the second speech duration overlap each other;
wherein the first target language sentence is outputted when the first speaker is selected.

14. A speech translation apparatus comprising:
a speech recognition unit configured to recognize a first speech of a first speaker so as to generate a first source language sentence, and configured to recognize a second speech of a second speaker who is different from the first speaker so as to generate a second source language sentence;
a machine translation unit configured to translate the first and second source language sentences into first and second target language sentences, respectively;
a speech detecting unit configured to detect a first speech duration from the first speech and a second speech duration from the second speech;
a first output unit configured to output the first target language sentence;
a second output unit configured to output the second target language sentence;
an output timing adjustment unit configured to adjust at least one of the first output unit and the second output unit when the first speech duration and the second speech duration overlap each other; and
a speaker selection unit configured to select the first speaker or the second speaker based on a pattern of the first source language sentence and a pattern of the second source language sentence, when the first speech duration and the second speech duration overlap each other, wherein
the first output unit outputs the first target language sentence when the speaker selection unit selects the first speaker, and the second output unit outputs the second target language sentence when the speaker selection unit selects the second speaker.

15. A speech translation method comprising:
recognizing a first speech of a first speaker to generate a first source language sentence;
recognizing a second speech of a second speaker who is different from the first speaker to generate a second source language sentence;
translating the first source language sentence into a first target language sentence;
translating the second source language sentence into a second target language sentence;
detecting a first speech duration from the first speech;
detecting a second speech duration from the second speech;
outputting the first target language sentence;
outputting the second target language sentence;
adjusting at least one of (i) the outputting of the first output unit and (ii) the outputting of the second output unit, when the first speech duration and the second speech duration overlap each other; and
selecting the first speaker or the second speaker based on a pattern of the first source language sentence and a pattern of the second source language sentence, when the first speech duration and the second speech duration overlap each other, wherein
the first target language sentence is output when the first speaker is selected, and
the second target language sentence is output when the second speaker is selected.

16. A computer program product having a non-transitory computer readable medium comprising programmed instructions for performing a speech translation processing, wherein the instructions, when executed by a computer, causes the computer to perform:
recognizing a first speech of a first speaker to generate a first source language sentence;
recognizing a second speech of a second speaker who is different from the first speaker to generate a second source language sentence;
translating the first source language sentence into a first target language sentence;
translating the second source language sentence into a second target language sentence;
detecting a first speech duration from the first speech;
detecting a second speech duration from the second speech;
outputting the first target language sentence;
outputting the second target language sentence;
adjusting at least one of (i) the outputting of the first output unit and (ii) the outputting of the second output unit, when the first speech duration and the second speech duration overlap each other; and
selecting the first speaker or the second speaker based on a pattern of the first source language sentence and a pattern of the second source language sentence, when the first speech duration and the second speech duration overlap each other, wherein
the first target language sentence is output when the first speaker is selected, and
the second target language sentence is output when the second speaker is selected.

* * * * *